Dec. 10, 1940. A. BRAMHALL 2,224,533
CREAM SEPARATOR DEVICE
Filed Feb. 24, 1939
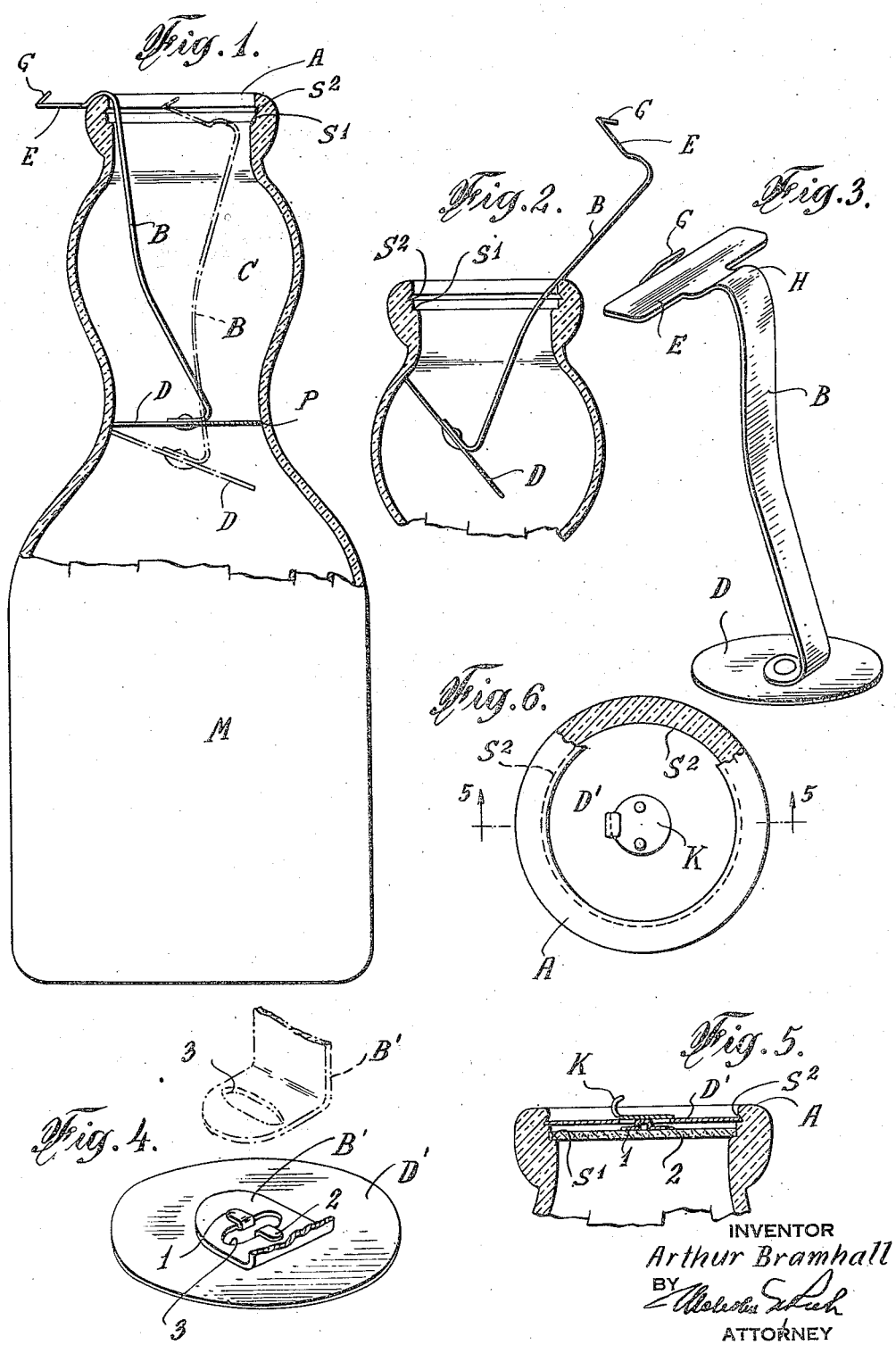
INVENTOR
*Arthur Bramhall*
BY
ATTORNEY Patented Dec. 10, 1940

2,224,533

UNITED STATES PATENT OFFICE 2,224,533

CREAM SEPARATOR DEVICE

Arthur Bramhall, Livingston, N. J.

Application February 24, 1939, Serial No. 258,149

4 Claims. (Cl. 210—51.5)

This invention relates to cream separator devices for use in combination with milk bottles and to an improved milk bottle for use in combination with the said separator device.

One of the objects of the present invention is to provide an improved cream separator device for milk bottles. Another object is to provide an improved milk bottle. Still another object is to provide an improved combination of bottle and separator device. Other objects and advantages will be apparent as the invention is more fully disclosed.

In accordance with these objects, I have devised a cream separator device and milk bottle for use in combination therewith of which the following, taken with the drawing, is a full and complete description.

In the drawing, Fig. 1 is a side elevational view partly in section illustrating the improved milk bottle of the present invention with the improved cream separator device shown in operative position therein; Fig. 2 is a fragmentary view showing one operating position of the separator device in the bottle; Fig. 3 is a perspective view of the separator device of the present invention; Fig. 4 is a perspective view illustrating a modified form of separator; Fig. 5 is a sectional view illustrating one feature of the present invention and Fig. 6 is a top plan view partly in section of the same.

Referring to the drawing, the present invention comprises in combination a two compartment milk bottle and a separator device for use with said bottle. The bottle, which is comprised preferably of glass as is customary in the art, has an upper cream chamber C and a lower milk chamber M connected together by passageway P of a diameter at least as large as the diameter of bottle mouth A. The bottle wall above and below passageway P is curved towards and away from the smallest diameter of passageway P substantially as indicated in the drawing to provide for ready drainage of liquid from one chamber into the other. The mouth A of the bottle is provided with two seats SI—S2, seat SI being substantially identical to that heretofore provided for the seating of the usual type of milk cap closure members therein and seat S2 being an undercut seat of larger diameter than seat SI and being located above seat SI but in spaced relation thereto for the seating of an auxiliary closure member therein as hereinafter will be disclosed.

The cream separator device of the present invention comprises a spring disc member D having a diameter approximating but larger than the smallest diameter of passageway P of the bottle and means to position the said disc D in closure position across the passageway P with the peripheral edge of the disc D in spring engagement with the under curving wall of the passageway P and means to effectively sustain the disc in said spring engaged position.

To locate the disc D in closure position, I provide an arm B, one end of which is secured to the disc D at a point which is approximately its axial center but in such manner as to locate the arm angularly to the normal with respect to the surface of the disc. The opposite end of the arm B is provided with a hook H and the length of the arm between the hook H and the disc D and the angular relation of the arm B and the disc D is adapted to provide for the exact location of disc D in spring engagement across the passageway P when hook end H is slipped over the edge of the bottle mouth A in the position shown in solid line in Fig. 1. In this position it may be perceived that the hook end of the arm maintains disc D under spring tension with the result that the separator device is locked in the position shown.

To facilitate the handling and the locating of the separator device within the bottle, I provide the outer end of hook H with a cross-piece E having a length approximating the diameter of seat SI in the mouth of the bottle which operates to dependingly sustain the separator in the position shown in dotted lines (Fig. 1) and further provides a handle means G on the cross-piece E to permit ready picking up of the separator when in the suspended position shown in dotted line (Fig. 1).

As a further improvement to the separator device arm B, preferably but not necessarily, may be provided with a double bend substantially as shown, the function of which may be noted in Fig. 2. The disc D being of larger diameter than the mouth of the bottle offers considerable spring resistance to passing through the mouth of the bottle until after it has been forced half way therethrough. Beyond this point the spring tension urges the disc through the opening which often will cause a splashing out of the bottle contents. As may be noted, by providing a kink or bend at a point approximately in the middle of the arm, the arm may be rested on the edge of the bottle to assist in the passing of the disc through the bottle mouth and to assist in resisting the spring advance of the disc into the chamber C.

The passing of disc D through passageway P of the bottle is relatively simple as the diameters of the disc and passageway are approximately the same with the disc slightly larger. When in full advanced position, as shown in dotted lines (Fig. 1) the separator then may be moved to the position shown in solid line (Fig. 1) by engaging the hook end H over the edge of the bottle mouth thereby bringing the peripheral edge of the disc into spring engagement with the under curved surface of the bottle at a point below the smallest diameter of passageway P. The bottle now may be tipped and the cream poured out of upper chamber C without emptying lower chamber M. The relative size or capacity of the two chambers C and M should be such that with the usual butter fat content of the milk the cream line lies slightly above the smallest diameter of passageway P.

As a modification of the present invention disc D may be detachably secured to the end of arm B, substantially as indicated in Fig. 4, wherein D' is shown provided with opposing ear flaps 1—2 which may be welded thereto or stamped therefrom, and arm B' is provided with an oval opening 3 adapted to permit flaps 1—2 to pass therethrough when the opening is in the position shown in dotted lines, and when rotated around to the solid position shown, to engage therewith to securely hold the disc D onto said arm B.

The detachable disc D' may be utilized as indicated in Fig. 5 as a secondary seal across the bottle mouth A above the usual seal L provided seating in seat S1. When so used, seat S2 is preferably undercut substantially as shown and has a diameter approximating that of disc D'. To facilitate the removal of D' from bottle closure position I provide means such as hook or handle K thereon which may be welded or riveted onto the under surface of the disc D' as indicated in Fig. 6.

In the construction of the separator device of the present invention I preferably employ metal such as spring steel, Monel metal, stainless steel and the like, however it is not to be construed that I am limited thereby as many other materials having suitable spring characteristics may be utilized if desired.

It is believed apparent that many modifications may be made without departing essentially from the nature and scope of the present invention and all departures are contemplated as may fall within the scope of the following claims.

What I claim is:

1. A cream separator device for a milk bottle having an upper cream chamber and a lower milk chamber communicating with each other through a restricted passageway axially aligned with the bottle mouth and of a diameter approximating but larger than that of the said bottle mouth, said separator device comprising a disc member consisting of spring sheet material having a diameter approximating but larger than the diameter of said passageway and means to locate and to secure the said disc member in closure position across said passageway, said means comprising an arm means having one end fixedly secured to the disc member at about its axial center and the other end provided with a hook means to engage the lip of the bottle mouth, the length of said arm and the angular relation of the same with respect to the surface of the said disc member being adapted to locate the said disc member automatically horizontally in closure position across the said passageway with the periphery of the disc in spring engagement with the inner surface of the passageway when the said hook means is slipped over and in engagement with the said bottle mouth.

2. The separator device of claim 1, wherein said disc member is detachably secured to said arm means.

3. The separator device of claim 1, wherein the angular relation of the said arm with respect to the said disc member provides an effective off-center arm attachment to the disc member on the side of the disc member opposite to the side over which the said hook means is disposed.

4. The separator device of claim 1, wherein the angular relation of the said arm with respect to the said disc member provides an effective off-center arm attachment to the disc member on the side of the disc member opposite to the side over which the said hook means is disposed and wherein at a point intermediate the said point of attachment and the said hook means the length of the said arm is provided with a bend forming a shoulder to facilitate the introduction of the disc member through the mouth of the said bottle.

ARTHUR BRAMHALL.